United States Patent
Fagiani

(10) Patent No.: US 11,520,572 B2
(45) Date of Patent: Dec. 6, 2022

(54) APPLICATION OF SCHEDULED PATCHES

(71) Applicant: Oracle International Corporation, Redwood Shores, CA (US)

(72) Inventor: Christopher Fagiani, Amherst, NY (US)

(73) Assignee: Oracle International Corporation, Redwood Shores (CA)

( * ) Notice: Subject to any disclaimer, the term of this patent is extended or adjusted under 35 U.S.C. 154(b) by 399 days.

(21) Appl. No.: 16/691,469

(22) Filed: Nov. 21, 2019

(65) Prior Publication Data
US 2021/0081190 A1    Mar. 18, 2021

Related U.S. Application Data

(60) Provisional application No. 62/900,159, filed on Sep. 13, 2019.

(51) Int. Cl.
*G06F 8/65* (2018.01)
*G06Q 10/10* (2012.01)
*H04L 9/40* (2022.01)
*H04L 9/08* (2006.01)

(52) U.S. Cl.
CPC ........... *G06F 8/65* (2013.01); *G06Q 10/1097* (2013.01); *H04L 9/0819* (2013.01); *H04L 63/0428* (2013.01); *H04L 63/168* (2013.01)

(58) Field of Classification Search
CPC ..... G06F 8/65; H04L 9/0819; H04L 63/0428; H04L 63/168; G06Q 10/1097
See application file for complete search history.

(56) References Cited

U.S. PATENT DOCUMENTS

| | | | | |
|---|---|---|---|---|
| 7,873,959 | B2 * | 1/2011 | Zhu | G06F 8/65 |
| | | | | 717/172 |
| 8,490,064 | B2 * | 7/2013 | Shrivastava | G06F 11/0715 |
| | | | | 717/130 |
| 9,904,534 | B2 * | 2/2018 | Kuchibhotla | H04L 67/34 |
| 10,020,940 | B2 * | 7/2018 | Freed | H04L 63/0442 |
| 10,169,081 | B2 * | 1/2019 | Sawhney | G06F 16/2272 |
| 2006/0174242 | A1 * | 8/2006 | Zhu | G06F 8/65 |
| | | | | 717/172 |
| 2008/0302871 | A1 * | 12/2008 | Rehman | G06Q 10/06 |
| | | | | 235/385 |
| 2009/0210702 | A1 * | 8/2009 | Welingkar | G06F 8/60 |
| | | | | 713/168 |

(Continued)

*Primary Examiner* — Lewis A Bullock, Jr.
*Assistant Examiner* — Theodore E Hebert
(74) *Attorney, Agent, or Firm* — Trellis IP Law Group, PC

(57) ABSTRACT

A method for updating software in one or more servers in a managed system includes bootstrapping of shared secrets to secure communication, using an object store with publicly accessible URLs as a mailbox system between a patch agent locally at the managed system and a patch management server located remotely. The object store provides for indirect and asynchronous communication, allowing the patch management server to manage the updates, whereas the patch agent executes the updates. The patch management server keeps track of update results, and when an update is unsuccessful it performs and supports a remediation process. Both the patch agent and the patch management server keep full logs of the update results to allow for auditing.

17 Claims, 10 Drawing Sheets

(56) References Cited

U.S. PATENT DOCUMENTS

| | | | |
|---|---|---|---|
| 2012/0159140 A1* | 6/2012 | Chang | G06F 9/4401 713/2 |
| 2013/0086199 A1* | 4/2013 | Frank | G06F 9/544 709/213 |
| 2013/0159704 A1* | 6/2013 | Chandrasekaran | H04L 9/0897 713/155 |
| 2013/0185563 A1* | 7/2013 | Djabarov | H04L 67/34 717/173 |
| 2014/0101263 A1* | 4/2014 | Wu | H04L 51/00 709/206 |
| 2014/0129838 A1* | 5/2014 | Kim | H04L 63/0807 713/171 |
| 2014/0245266 A1* | 8/2014 | Sun | G06F 11/3664 717/124 |
| 2015/0180840 A1* | 6/2015 | Jung | G06F 8/65 713/150 |
| 2016/0188317 A1* | 6/2016 | Hilliar | H04L 67/34 717/172 |
| 2016/0246976 A1* | 8/2016 | Freed | H04L 9/0819 |
| 2016/0350098 A1* | 12/2016 | Kuchibhotla | G06F 8/65 |
| 2017/0126614 A1* | 5/2017 | Sinha | H04L 67/02 |
| 2017/0237560 A1* | 8/2017 | Mueller | H04L 9/30 713/168 |
| 2017/0264432 A1* | 9/2017 | Horowitz | G06F 21/602 |
| 2018/0121239 A1* | 5/2018 | Sawhney | G06F 9/4881 |
| 2018/0191715 A1* | 7/2018 | Chastain | H04L 51/38 |
| 2019/0114438 A1* | 4/2019 | Hersans | H04L 9/0894 |
| 2019/0173674 A1* | 6/2019 | Agarwal | H04L 9/0891 |
| 2019/0205541 A1* | 7/2019 | Zimny | G06F 9/4406 |
| 2019/0286837 A1* | 9/2019 | Yim | G06F 21/6227 |
| 2021/0081190 A1* | 3/2021 | Fagiani | H04L 9/0891 |

\* cited by examiner

```
// Decrypted Manifest (pretty-printed)                                    800
{
    "patch_schedules": [
    {
        "customer_id": 1,
        "id": 2,
        "json_md5_checksum": "11C535C7735754AB24317DFEE75FE69D",
        "manifest_version": 1,
        "artifacts": [
        {
            "artifact": "https://objectstorage.us-ashburn-1.oracleoud.com/p/bDbTDRE/n/"
            "decryption_key": "8deec885781c421794ceda8af70a5e63",
            "download_dir": "useless_artifacts"
        }
        ],
        "patches":   [
        {
            "name": "cat a downloaded file"
            "command": "cat {{ patch_download_dir }} / useless_artifacts/testmf.json" ,
            "id": 3,
            "pdd_id": 18,
            "type": "SHELL",
            "when": "before",
            "expected_duration": "PT1M"
        },
        {
            "command_args": "component=oss ver=18_4_6 patchset=18.4.6_OSS_Upgrade.tar",
            "id": 1,
            "pdd_id": 6,
            "patch_checksum": "fakePatchChecksum",
            "path": "\/opt\/cre_patches \/18.4.6_OSS_Upgrade.tar",
            "stage_loc": "CORE",
            "stage_mode: "OSS",
            "type": "ANSIBLE",
            "upload_logs": true,
            "when": "during",
            "expected_duration": "P1YT1M"
        },
        {
            "command_args":  "component=oss ver=18_4_8 patchset=18.4.8_OSS_Upgrade.tar",
            "id": 2,
            "pdd_id": 6,
            "patch_checksum": "fakePatchChecksum",
            "path": "\/opt\/cre_patches\/18.4.8 OSS_Upgrade.tar",
            "stage_loc": "CORE",
            "stage_mode  "OSS",
            "type": "ANSIBLE",
            "upload_logs": true,
            "when": "during",
            "expected_duration": "P1DT10H"
        }
        ],
        "rack_id": 1,
        "response_url": "https:\/\/caspar.oracle.com\/foo\/",
        "window_end": "2019-08-03T00:30:29.379Z",
        "window_start": "2019-08-02T18:30:29.379Z"
    }
    ]
}
```

FIG. 8

APPLICATION OF SCHEDULED PATCHES

CROSS REFERENCES TO RELATED APPLICATIONS

This application claims the benefit of U.S. Provisional Patent Application Ser. No. 62/900,159, entitled APPLICATION OF SCHEDULED PATCHES, filed on Sep. 13, 2019, which is hereby incorporated by reference as if set forth in full in this application for all purposes.

BACKGROUND

The present invention is in the field of maintaining software environments and, more particularly, in the field of keeping cloud servers up to date and secure, also known as cloud patch management.

Many corporations require their workers to use "cloud-based" software, i.e., software running on remote servers. This way, they can guarantee that everybody has access to a state-of-the-art working environment, and they can much better control the environment's efficiency, consistency, and security. However, not all corporations are willing to depend on a cloud running in somebody else's physical control. Instead, they host their own cloud servers and may allow an outside service provider to, within strict limitations, manage the cloud environment. A significant part of managing the cloud environment is keeping it up to date by applying "patches". In this context, a "patch" can be the installation of new binaries, the execution of a script, and/or execution of a playbook, a change to a configuration, or any other modification that impacts proper functionality or operation of the managed system. In the context of this document, a patch may also be called an update.

The limitations for managing the cloud environment are mostly based on IT security concerns. Conventionally, a maintenance window is negotiated during which all patches must be made, and a service provider patch operator may manage the process during this window. Human management of the process makes it slow and error prone either due to executing the patches outside of the negotiated window or to errors in the execution of the software update itself. Also, for the service provider it does not scale as the number of managed systems grows (unless the number of operators applying the patches increases proportionally). A service provider may manage periodic patches and updates of thousands of managed systems owned by many customers, most of which managed systems are located remotely. Different managed systems have different maintenance windows and different sets of patches, some of which may be disruptive. In such a situation, distribution and application of patches is problematic.

The conventional approach that relies on human operators of the outside party to log in to the managed system and perform the software update during the prescribed window. However, companies are uncomfortable allowing the service provider to directly connect and initiate the update process. An additional problem is that the service provider may lack means of automatically identifying the addresses of the managed systems. If the service provider cannot initiate connectivity (the "push" model, from pushing out the updates), the patch system must rely on a "pull" model (i.e., the managed system reaches out to the patch management server).

Some approaches rely on the pull model and the customer connects to the patch management server via a virtual private network (VPN) connection. The direct connectivity to the patch management server provides for an efficient communication channel, but not for efficient or even fully secure communication.

SUMMARY

Many corporations require their workers to use "cloud-based" software, i.e., software running on remote servers. This way, they can guarantee that everybody has access to a state-of-the-art working environment, and they can much better control the environment's efficiency, consistency, and security. However, not all corporations are willing to depend on a cloud running in somebody else's physical control. Instead, they host their own cloud servers and may allow an outside service provider to, within strict limitations, manage the cloud environment. A significant part of managing the cloud environment is keeping it up to date by applying "patches". In this context, a "patch" can be the installation of new binaries, the execution of a script, and/or execution of a playbook, a change to a configuration, or any other modification that impacts proper functionality or operation of the managed system. In the context of this document, a patch may also be called an update.

Embodiments of the invention use a "pull" approach to provide remote maintenance services for cloud environments ("managed systems"). The pull approach allows a customer to initiate the maintenance service process, rather than the outside service provider. The embodiments generally avoid a direct connection between a service provider-controlled "patch management server" and the managed system. Instead, the patch management server and the managed system exchange messages and data via an "object store" that is customer-accessible via Internet. Embodiments may rely on publicly available hypertext transfer protocol secure (HTTPS) or file transfer protocol secure (FTPS) endpoints as the sole port of communication with the object store for a managed system. These endpoints are addressed using uniform resource locators (URLs). Use of the endpoints preserves security and traceability as described in this document.

To secure communication, the customer and service provider must share secrets, including the location of the endpoints, keys with which the patch and related information is encrypted, and the identity of server racks that must be managed. Embodiments fully automate the process of sharing these secrets using a bootstrap procedure.

Upon completion of the bootstrap process, the patch management server can schedule and issue patches for each rack of servers included in the managed system. It provides a manifest with the schedules to the object store and it uploads the patches in the object store. A "patch agent", included in or collocated with the managed system, fetches the manifest, downloads the patches, and generally executes the patches during the agreed "maintenance window". The patch agent reports results of the patches (patch statuses) back to the object store. The patch management server inspects the patch statuses and upon patch failure, initiates interaction with the patch operator, who reviews the issue and takes manual action to resolve the issue and prevent its recurrence in future automated updates.

In a first aspect, an embodiment provides a method for updating software in one or more servers in a managed system remotely. The method includes the following steps.

(210) bootstrapping secure communication by sending a first message from the managed system to an object store. The first message includes an identifier of the one or more servers and an encryption key.

(220) A patch management server retrieves the first message from the object store, registers the one or more servers, determines one or more locations in the object store to be used for subsequent messages regarding the one or more servers, and adds an encrypted section to a registration object. The encrypted section includes the one or more locations, and makes the registration object available in the object store.

(230) The patch management server sends a second message to the object store. The second message holds a manifest with a schedule for a software update in the one or more servers identified in the first message and a specification of the software update. The patch agent retrieves the second message from the object store and stores the schedule in a schedule database.

(240) The patch agent applies the software update during a maintenance window specified in the schedule and sends a third message to the object store. The third message includes a result of the software update.

(260) The patch management server retrieves the third message from the object store and determines from the result if the software update was successful.

(270) If the software update was not successful, the patch management server alerts a patch operator of the result and provides the patch operator details about the software update.

(280) The patch agent receives a resolution from the patch operator and applying the resolution to successfully complete the software update.

In a second aspect, an embodiment provides a patch agent apparatus that bootstraps secure communication by sending a first message with an encryption key and server identification to the object store; retrieving a second message with a schedule from the object store; and applying a software update during a maintenance window specified in the schedule and sending a third message to the object store. The third message holds a result of the software update. For an unsuccessful software update, the embodiment receives a resolution from a patch operator and applies it to successfully complete the software update.

In a third aspect, an embodiment provides a non-transitory media with instructions to (410) poll a key bucket; (420) finding a first message with a GUID, an encryption key, and a server identifier in the key bucket; (430) registering the servers and associating the GUID and encryption key with the servers; (440) assigning one or more locations in the object store (and their URLs) for communication about the servers; (450) encrypting the URLs with the encryption key; (460) updating a registration object; (610) scheduling maintenance; (620) selecting applicable patches; (630) creating a schedule with the applicable patches; (640) registering the schedule; (650) uploading a manifest with the schedule to the object store: (660) polling the object store for a patch result; (670) determining if the patch was successful: and (680) if not, then alerting a patch operator.

BRIEF DESCRIPTION OF THE DRAWINGS

FIG. 8 illustrates an example of an unencrypted (or decrypted) manifest according to an embodiment of the invention;

DETAILED DESCRIPTION

Figure 1:
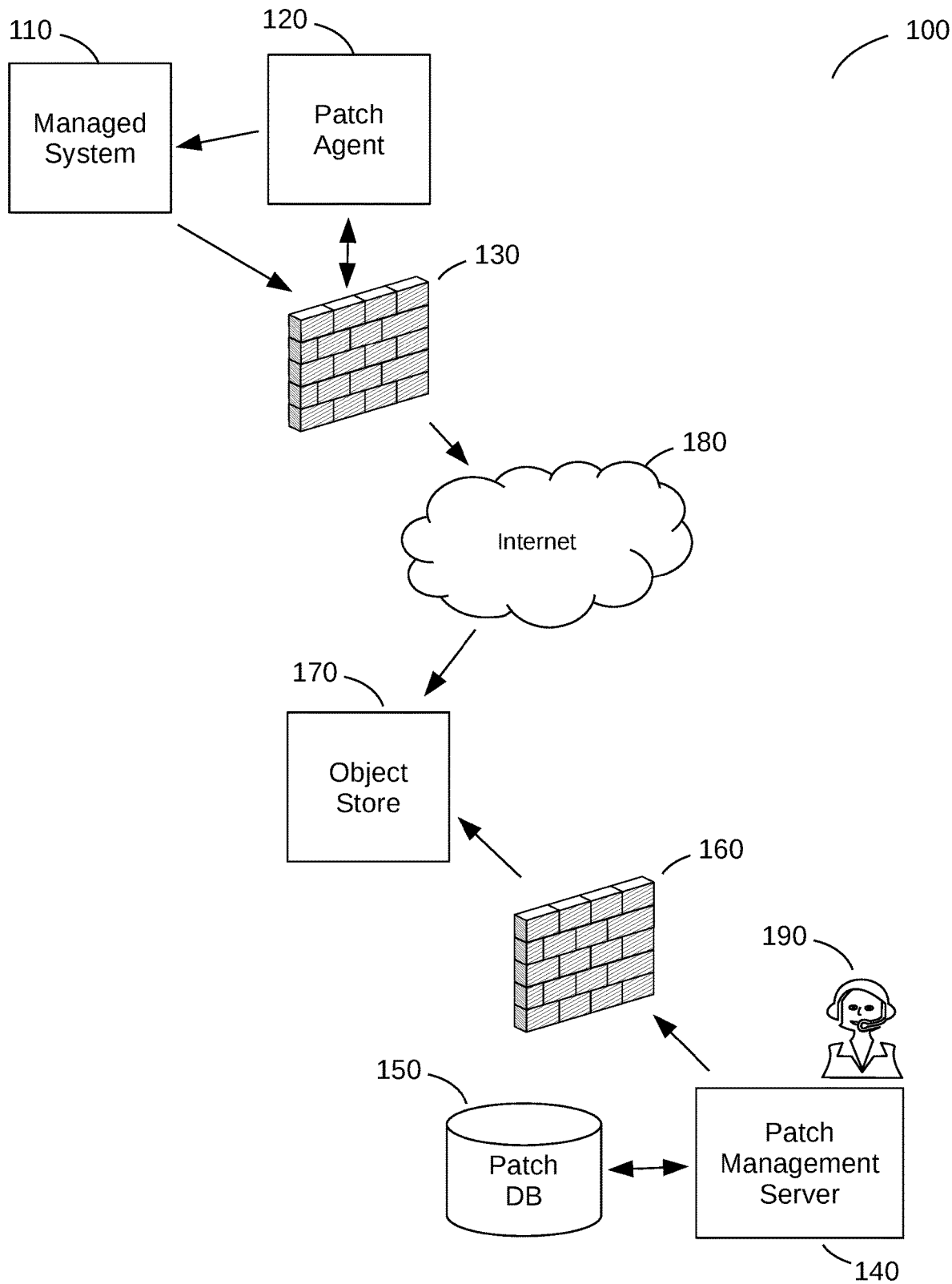
FIG. 1 illustrates high-level components and their communication channels in an example embodiment.

Many corporations require their workers to use "cloud-based" software, i.e., software running on remote servers. This way, they can guarantee that everybody has access to a state-of-the-art working environment, and they can much better control the environment's efficiency, consistency, and security. However, not all corporations are willing to depend on a cloud running in somebody else's physical control. Instead, they host their own cloud servers and may allow an outside service provider to, within strict limitations, manage the cloud environment. A significant part of managing the cloud environment is keeping it up to date by applying "patches". In this context, a "patch" can be the installation of new binaries, the execution of a script, and/or execution of a playbook, a change to a configuration, or any other modification that impacts proper functionality or operation of the managed system. In the context of this document, a patch may also be called an update.

The Patch System

Embodiments of the invention use a "pull" approach to provide remote maintenance services for cloud environments ("managed systems"). The pull approach allows a customer to initiate the maintenance service process, rather than the outside service provider. The embodiments generally avoid a direct connection between a service provider-controlled "patch management server" and the managed system. Instead, the patch management server and the managed system exchange messages and data asynchronously via a mailbox system called the "object store" that is customer-accessible via Internet. In some embodiments, the object store includes a web server and a managed system's sole port of communication with the object store is via publicly available hypertext transfer protocol secure (HTTPS) endpoints. In other embodiments, the object store may include some other means of communication, for example a file transfer protocol (FTP) server, and the managed system's sole port of communication with the object store is via publicly available file transfer protocol secure (FTPS) endpoints. The endpoints are addressed using uniform resource locators (URLs). Use of the endpoints preserves security and traceability as described in this document.

To secure communication, the customer and service provider must share secrets, including the URLs, keys with which the patch and related information is encrypted, and the identity of server racks that must be managed. Embodiments fully automate the process of sharing these secrets using a bootstrap procedure.

Upon completion of the bootstrap process, the patch management server can schedule and issue patches for each rack of servers included in the managed system. It provides a manifest with the schedules to the object store and it uploads the patches in the object store. A "patch agent", included in or collocated with the managed system, fetches the manifest, downloads the patches, and executes the patches during an agreed "maintenance window". The patch agent reports results of the patches (patch statuses) back to the object store. The patch management server inspects the patch statuses and upon patch failure, initiates interaction with a human operator (the "patch operator"), who reviews the issue and takes manual action to resolve it and prevent its recurrence in future automated updates.

FIG. 1 illustrates high-level components and their communication channels in an example embodiment 100. Example embodiment 100 comprises managed system 110, patch agent 120, managed system firewall 130, patch management server 140 with patch database 150 and patch management firewall 160, as well as object store 170 and network 180, which may be or comprise Internet. Additionally, patch operator 190 may access a patch management application running on patch management server 140. Managed system firewall 130 is in control of the client and protects managed system 110 and patch agent 120 from intrusions from malicious users of network 180. Patch management firewall 160 is in control of the service provider and protects patch management server 140 and patch database 150 from external intrusions. Patch management server 140 can directly access object store 170 through patch management firewall 160, and patch agent 120 can access object store 170 via network 180. Patch agent 120 and patch management server 140 use object store 170 as a mailbox through which they securely exchange messages, thus avoiding the need to ever establish a direct connection between managed system 110 or patch agent 120 and patch management server 140.

The managed system 110 may include one or more racks of servers, and any of these servers may run any operating system or multiple operating systems, including but not limited to Linux, Oracle Linux, Microsoft Windows, and Apple macOS. Managed system 110 may be located in a single geographic location, or it may be spread over many locations.

Patch agent 120 runs with or inside managed system 110. In embodiments, patch agent 120 is responsible for:
(1) generating an encryption key and posting it in object store 170;
(2) encrypting all messages for patch management server 140;
(3) decrypting all messages received from patch management server 140;
(4) posting messages to object store 170;
(5) polling object store 170 for a message with a manifest and downloading it when found;
(6) downloading a message with a patch from object store 170 and storing the patch in a local database;
(7) invoking a task to download, decrypt, and correctly store executables and scripts for a patch that has to be run;
(8) determining a maintenance window from the manifest;
(9) when the maintenance window starts, applying the patch and reporting its result to patch management server 140 by posting the patch status to object store 170; and
(10) reporting the patch status locally.

Patch management server 140 runs the patch management application, which includes a patch scheduler. In embodiments, the patch management application may handle:
(1) polling object store 170 for a message sent by managed system 110 or patch agent 120, wherein a message may comprise an encryption key, infrastructure information, a request, status information, or any other data pertinent to the patch process;
(2) decrypting the message;
(3) scheduling a patch;
(4) generating a manifest;
(5) encrypting all communication for managed system 110 and patch agent 120;
(6) publishing the manifest to object store 170;
(7) publishing a patch from patch database 150 in object store 170;
(8) keeping track of racks and computing apparatuses in managed system 110;
(9) keeping track of the result of the patch;
(10) alerting patch operator 190 if the patch is unsuccessful; and
(11) receiving and executing instructions from patch operator 190 to investigate and resolve an unsuccessful patch.

Object store 170 is or includes a web server that offers managed system 110 at least one read-only address and one write-only address, each with a rack-specific or customer-specific URL. Information can be read from or written to the addresses using the HTTPS protocol. In some embodiments, object store 170 offers managed system 110 more than one read-only address, or more than one write-only address. For example, an embodiment may offer one read-only and three write-only addresses, for example one for logs, one for response objects (e.g., status information), and one for "heartbeats" (messages that the system is still operational, and has not, for example, crashed).

Patch database 150 is a database that the service provider employs to store patches that may be used for any of multiple customers. Dependent on its size, patch database 150 may be stored in the same or separate hardware as patch management server 140.

Patch operator 190 is responsible for resolving patch failures. She or he works interactively with the patch management application. Patch management server 140 notifies patch operator 190 of a patch failure, and provides pertinent information, such as log files. Patch operator 190 reviews the information, and provides imminent and/or long-term fixes for the problem. Patch management server 140 communicates the fixes to patch agent 120.

Figure 2:
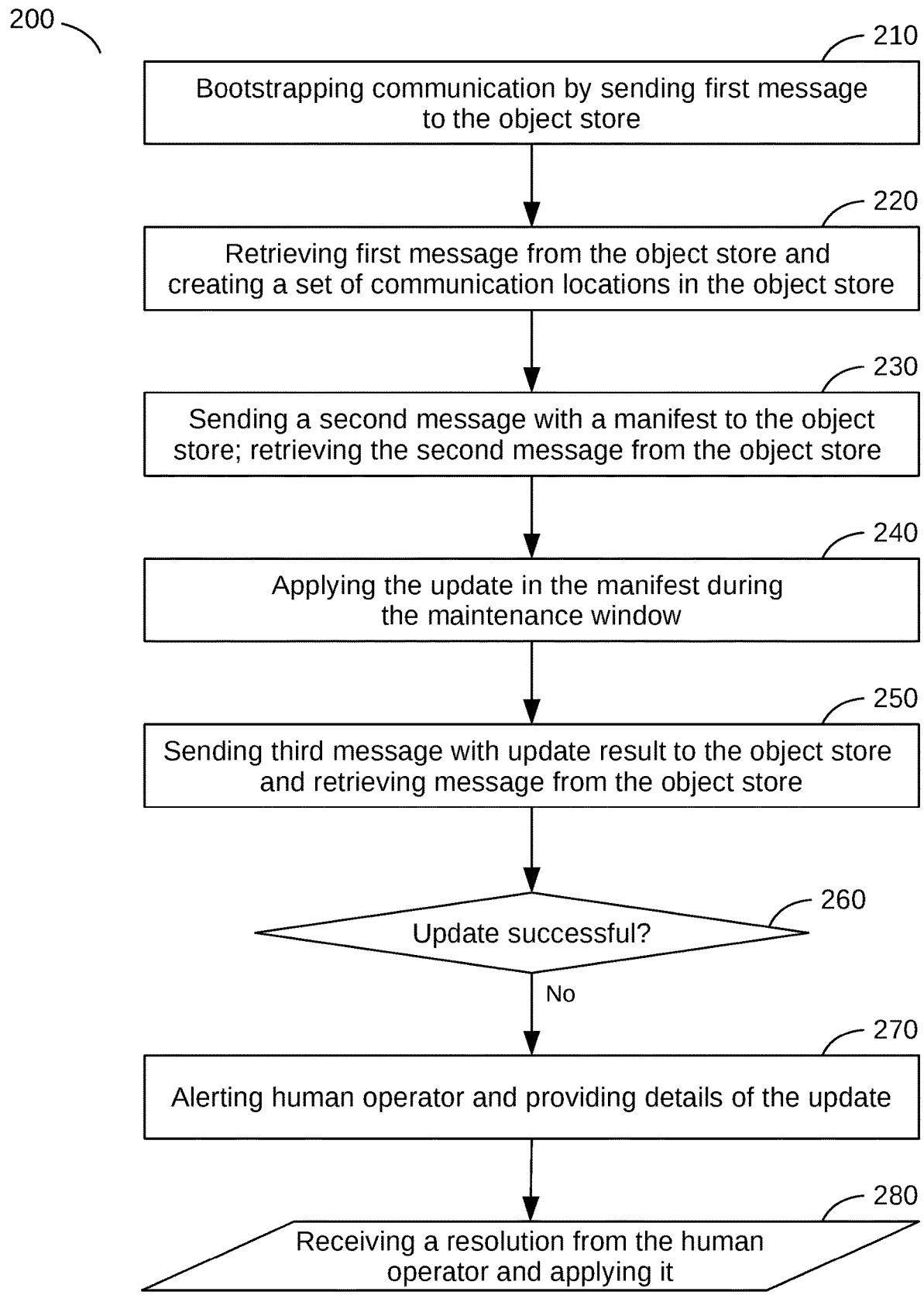
FIG. 2 illustrates a method for updating software in one or more servers in a managed system remotely according to an embodiment of the invention.

FIG. 2 illustrates a method 200 for updating software in one or more servers in a managed system remotely according to an embodiment of the invention. The one or more servers may be in a rack, and the managed system (e.g., managed system 110) may comprise a cloud environment. The managed system may include multiple racks of servers, and method 200 may be applied to each or all racks of servers. Communication may be asynchronous (indirect) and secured by encryption, the use of HTTPS protocols, and use of a mailbox system (an object store, e.g., object store 170) with publicly accessible, but secret mail slots. Method 200 includes the following steps.

Step 210—Bootstrapping secure communication by sending a first message from the managed system to the object store. The first message identifies the one or more servers and includes an encryption key. It may further include a globally unique identifier (GUID). In an embodiment, a patch agent (e.g., patch agent 120) inside or collocated with the managed system may send the first message. Method 200 uses the encryption key for all further communication between the patch agent and a patch management server (e.g., patch management server 140) via the object store. In some embodiments, the patch agent and the managed system may be located remotely from the object store and the management server. Embodiments use the GUID to identify information and messages regarding updates for and of the one or more servers.

Step 220—Retrieving the first message from the object store by the patch management server, and determining a schedule for a software update in the one or more servers identified in the first message. In some embodiments, the schedule includes a prenegotiated maintenance window during which the software update must be applied. In further embodiments, the patch management server determines or creates the schedule. The patch management server creates a manifest that includes the schedule and a specification of the software update. The software update may include installation of a new binary and/or executable, the execution of a script, the execution of a playbook, a change to a configuration, or any other modification that impacts proper functionality or operation of the managed system. An embodiment determines one or more locations in the object store to be used for subsequent messages regarding the one or more servers. It adds an encrypted section to a registration object. The encrypted section includes the one or more locations. The patch management server makes the registration objection available in the object store.

Step 230—Sending a second message from the patch management server to the object store. The second message includes the manifest. The patch agent retrieves the second message from the object store.

Step 240—Applying the software update during a maintenance window specified in the schedule. The patch agent applies the update and monitors its result. If a schedule includes multiple software updates, the patch agent applies the software updates in the order specified in the schedule.

Step 250—Sending a third message to the object store. The patch agent sends the third message. The third message carries the result from the software update. The patch management server retrieves the third message from the object store.

Step 260—Determining from the result if the software update was successful. The patch management server determines if the software update was successful.

Step 270—Upon determining that the software update was not successful, alerting a human operator (e.g., patch operator 190) of the result and providing the human operator details about the software update. In some embodiments, the human operator may use a "patch API" (application programmers' interface) to review details, such as logs, of the unsuccessful software update result.

Step 280—Receiving a resolution from the human operator and applying the resolution to successfully complete the software update. Some embodiments may use the object store to send a message that includes at least a part of the resolution from the patch management server to the patch agent. Other embodiments may establish a direct connection from the patch management server to the managed system, allowing the human operator to directly resolve the problem. Yet other embodiments may establish an alternative connection from the human operator to an IT worker located at the site of the managed system to jointly apply the resolution that resolve the problem.

Some embodiments provide features that include a microservices-based architecture. Further embodiments implement a regional deployment model where data is confined to regions. Yet further embodiments run playbooks as part of post-patching tasks.

Patch Agent Bootstrap Process

Embodiments rely on shared secrets. These shared secrets are used for communication (temporary URLs) and for security (private encryption keys). Embodiments maintain security with as little operator intervention as possible. They bootstrap and configure automatically as much as possible.

The bootstrap process relies on two or more preauthorized URLs, including at least one URL giving access to a shared write-only mail slot (here called the "key bucket URL") and at least one URL giving access to a shared read-only mail slot (here called the "registration object URL"). The key bucket URL and the registration object URL may be specific to a managed system. Some embodiments encode these URLs in a configuration shipped with or inside the patch agent binary, obviating the need to separately distribute them. Some further embodiments may use both an individual write-only URL and/or an individual read-only URL for each server, rack of servers, or other collection of servers within the managed system. Other embodiments use a shared read-only or write-only URL for all servers or racks of servers in the managed environment.

The bootstrap process establishes initial communication using the preauthorized URLs. In this initial communication, the patch agent communicates a message (for example, the first message in Step 210 in method 200) with a GUID along with an encryption/decryption key to the patch management server. Some embodiments use symmetric encryption, for example AES, Blowfish, DES, RC4, RC5, or RC6. Other embodiments use asymmetric encryption, for example RSA, DA, PKCS, ElGamal, or elliptic curve techniques. The message may further include an identifier of the one or more servers (for example, a rack of servers) that are included in the managed system. As an example, the message may look like:

```
{
    "GUID": "30089723-8B29-4854-AE66-086272668445",
    "rack_id": "cm379175",
    "key": "30089723-8B29-4854-AE66-086272668445.aes"
}
```

The patch management server responds by updating a registration object, as further detailed with reference to FIGS. 3 and 4. The updated registration object, which is legible for the patch agent, contains a key-value pair, wherein the key equals the GUID and the value includes an encrypted URL, or a reference to an encrypted URL. As an example, the registration object may look like:

```
{
    "30089723-8B29-4854-AE66-086272668445": {
        "payload":"/ZUKV/0OHxuVWIqUA0LlqvARyVB6UVx3"
    },
    "9f3089723-A769-8020-AFC2-055270068123": {
        "payload":"/AFKE/2aBxuVWIqUA0LlqvARyVB6UVx3"
    },
    "3d3798c5-6918-4587-8a15-709b329749ec": {
        "payload":"bCjDQmj44lCK+PSijONn7zl8XCVmkZiJ"
    }
}
```

As a further example, if the value includes a reference, as in the above example, the reference may look like the following after decryption:

```
{
    "heartbeat_url":
    "https://oraclecloud.com/p/KOPTTT7f/b/cm417158_heartbeat",
    "log_encryption_initialization_vector":
    "hKBvfCkkjA4lqE/A==",
    "log_url":
    "https://oraclecloud.com/p/I1tiK7JmT/b/cm417158_log",
    "logs_encryption_key":
    "XADVpPWil2CaM1HLKMx0-0TmNzVHWUWa97A=",
    "manifest_url":
    "https://oraclecloud.com/p/4LTX8Vo/b/cm417158_manifest.json",
    "response_url":
    "https://oraclecloud.com/p/oGPJtMdZ/b/cm417158_response"
}
```

In this example embodiment, the heartbeat_url may be a write-only URL to which the patch agent periodically posts a heartbeat message to indicate that it is still running correctly and can reach the object store. The log_encryption_initialization_vector may be an initialization vector used for performing encryption of log files. The log_encryption_key may be the encryption key used along with the initialization vector to encrypt the log files. The encryption key may be unique to a specific patch agent installation. The log_url may be a write-only URL to which patch log files are uploaded after encryption. The manifest_url may be the read-only URL that the patch agent should poll periodically to look for schedules pertaining to the managed system. And the response_url may be the write-only URL to which the patch agent must send its patch status messages and patch results.

Figure 3:
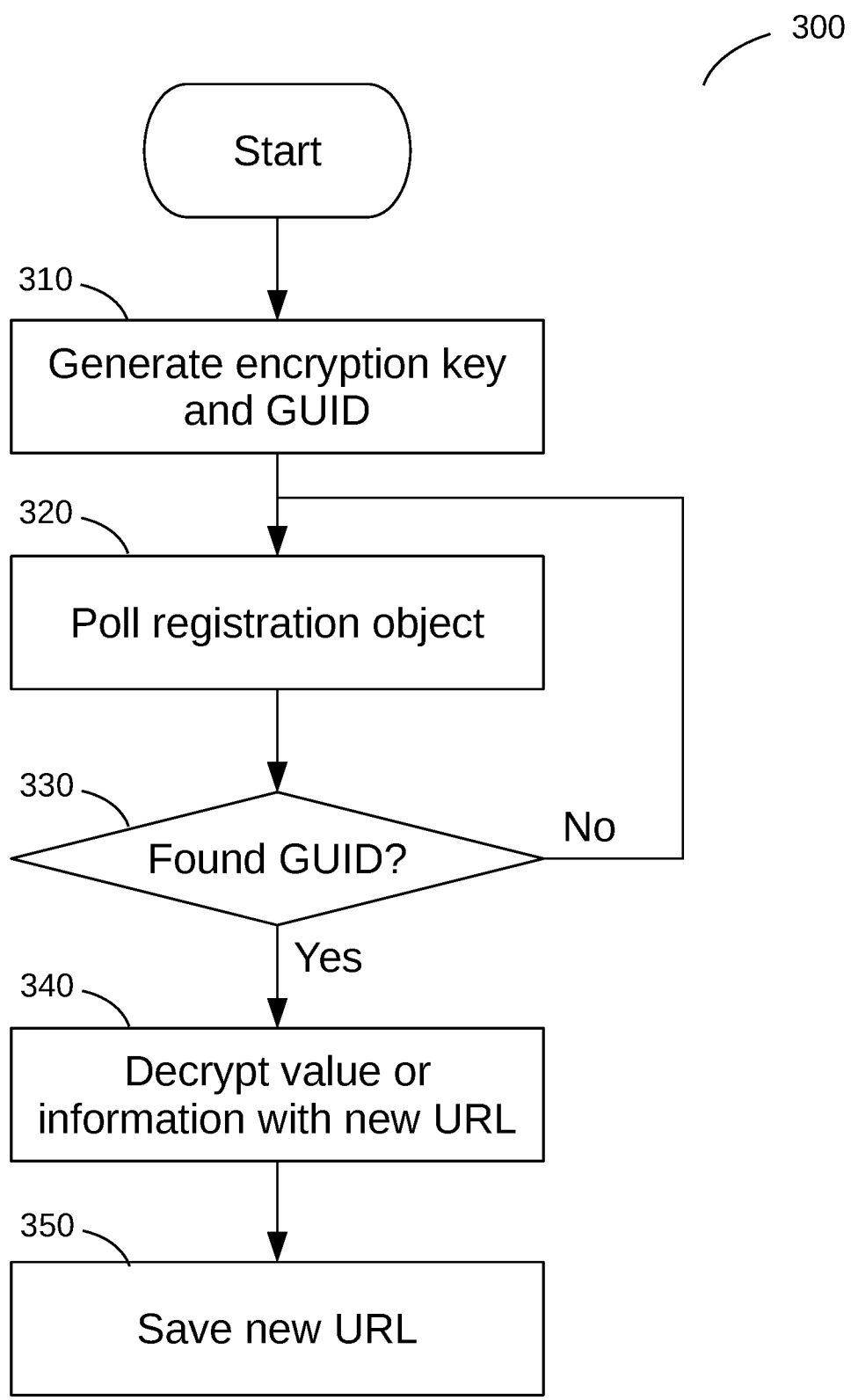
FIGS. 3 and 4 illustrate the bootstrap process with methods performed asynchronously on the patch agent and the patch management server respectively according to embodiments of the invention.
Figure 4:
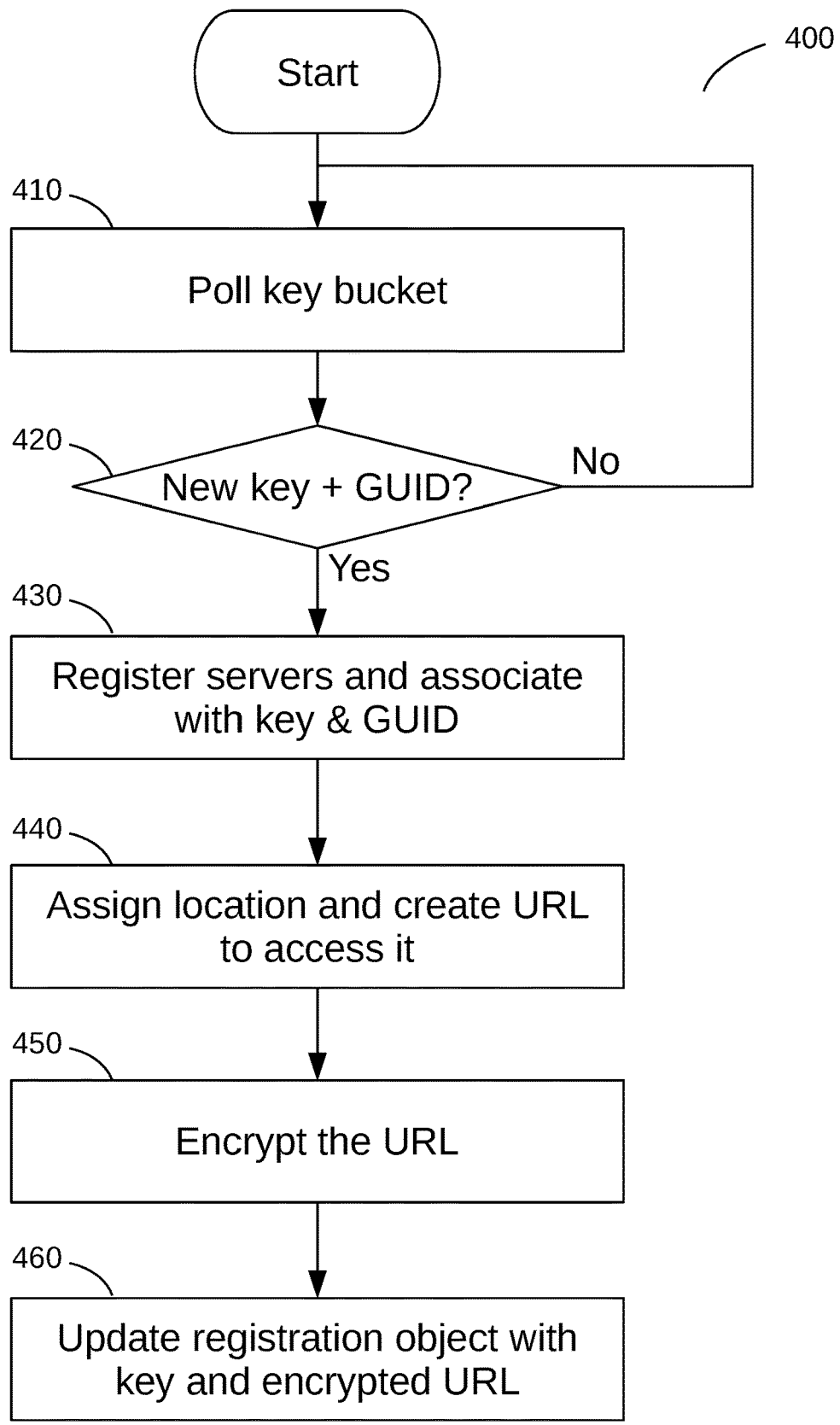

FIGS. 3 and 4 illustrate the bootstrap process with methods performed asynchronously on the patch agent and the patch management server respectively according to embodiments of the invention. FIG. 3 shows an example method 300 with which the patch agent registers one or more servers and retrieves the individual read-only URL that the patch management server assigns for communication specific to the one or more servers. The method includes the following steps.

Step 310—Generating a GUID and an encryption key associated with and specific to the one or more servers. The patch agent creates a message that includes the GUID, the encryption key, and a unique identifier of the one or more servers. The patch agent uploads the message to the object store using the key bucket URL.

Step 320—Polling a registration object that is published by the patch management server and available through the registration object URL at the object store.

Step 330—Determining if the registration object includes a key-value pair in which the key equals the GUID. Upon determining that there is no key equaling the GUID, repeating Step 320 and Step 330.

Step 340—Upon determining that the registration object includes a key-value pair in which the key equals the GUID, decrypting the value (or information in the location referred to by the value) using the encryption key to obtain the individual read-only URL for communication specific to the one or more servers.

Step 350—Saving the individual read-only URL to use it for communication specific to the one or more servers.

FIG. 4 shows an example method 400 with which the patch management server registers a set of one or more servers in the managed system and communicates the individual read-only URL for communication specific to the one or more servers to the patch agent. The method includes the following steps.

Step 410—Polling the key bucket. The patch management server polls a location (the key bucket) in the object store, accessible for the patch agent using the key bucket URL.

Step 420—Determining if the key bucket holds a message from the patch agent, and if the message holds a GUID, an encryption key, and an identifier of one or more servers. If not, then repeating Step 410 and Step 420.

Step 430—Upon determining that the key bucket holds a message with a GUID, an encryption key, and an identifier of one or more servers, registering the one or more servers, and associating the GUID and the encryption key with the one or more servers.

Step 440—Assigning a location in the object store for communication specific to the one or more servers and creating a read-only URL to access the location. Embodiments may use the location, for example, for storing a message with a manifest. The patch management server may create this message, and the patch agent may fetch the message.

Step 450—Encrypting the created read-only URL using the encryption key obtained in Step 420.

Step 460—Updating the registration object by adding a key-value pair, wherein the key equals the GUID obtained in Step 420 and the value includes the encrypted read-only URL (or a reference to a location of information that includes the encrypted read-only URL).

Embodiments may use the bootstrap process illustrated in FIGS. 3 and 4 when one or more new servers are added in a managed system. However, they may also use the bootstrap process for assigning a new encryption key (key rotation) to a previously added and registered server or rack of servers or other collection of servers. When the process is used in this manner, the embodiment automatically assigns a new location (mail slot) in the object store, and creates a new read-only URL for accessing the new location. In some embodiments, key rotation may be scheduled as a regular occurrence, or key rotation may be initiated upon request of a user or of the patch operator.

Figure 5:
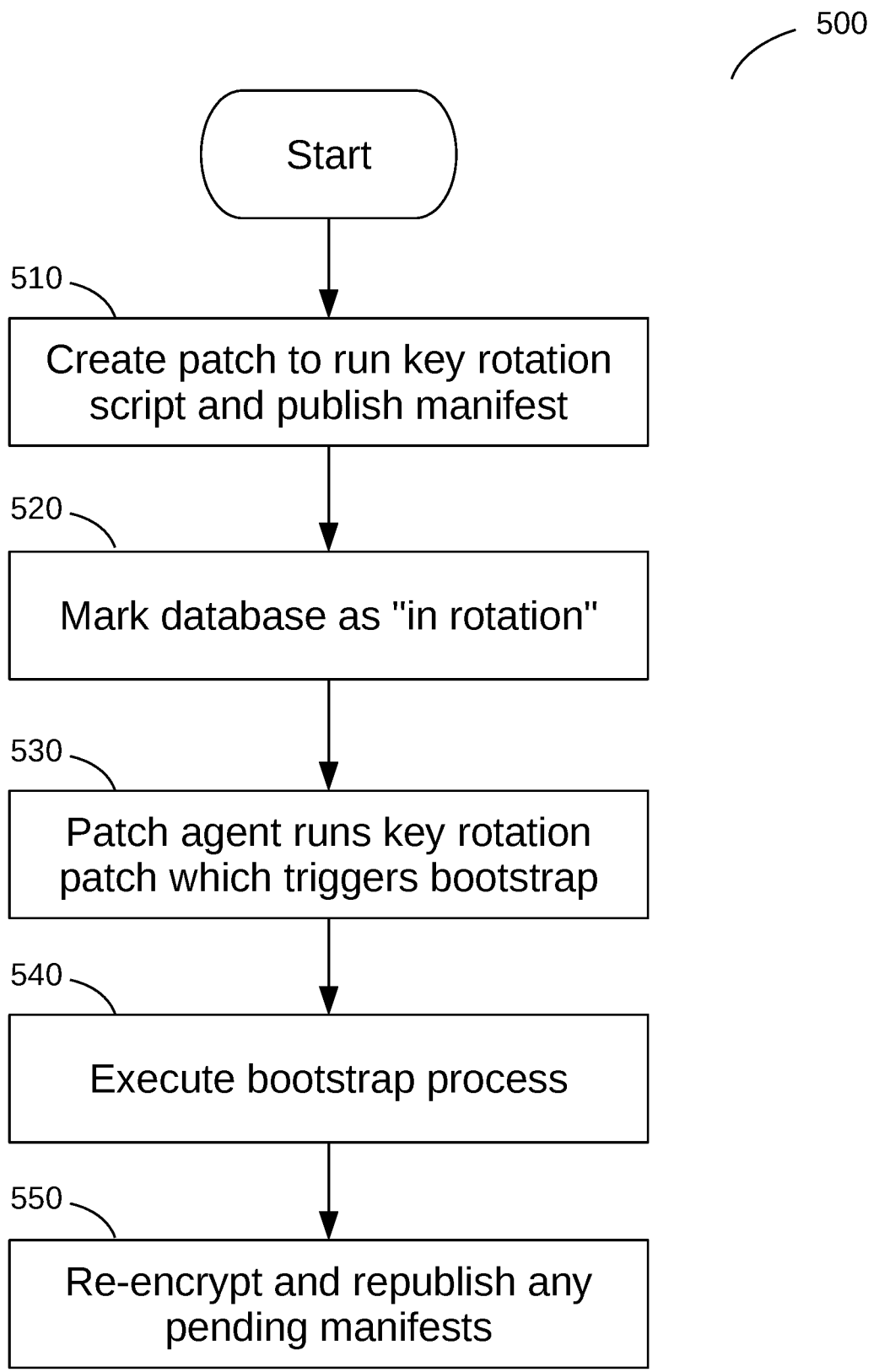
FIG. 5 illustrates additional details of an example method of using the bootstrap process for key rotation according to an embodiment of the invention.

FIG. 5 illustrates additional details of an example method 500 of using the bootstrap process for key rotation according to an embodiment of the invention. The method can be used for triggering key rotation from the patch management server, and includes the following steps:

Step 510—Creating a patch to run a key rotation script, and publishing a manifest for this patch to the patch agent via the object store.

Step 520—Marking the patch database as "in rotation" for the duration of the key rotation process. During this time, the patch management server will not publish new schedules for the applicable servers in the managed system. An embodiment may use a flag, a text, or any other means known in the art to mark the patch database as "in rotation".

Step 530—Executing the patch to run the key rotation script to trigger the bootstrap process. In some embodiments, guided by the key rotation script, the patch agent removes the old encryption key and object store URL from its local configuration.

Step 540—Executing the bootstrap process. Some embodiments may use the bootstrap process as described with reference to FIGS. 3 and 4.

Step 550—Re-encrypting and republishing any pending manifests and marking the patch database as no longer in rotation. Pending manifests may have been previously encrypted with an old encryption key. Since the old encryption key and object store URL are no longer valid, a pending manifest must be re-encrypted with the new encryption key, and must be published at the new location accessible with the new URL in the object store.

Patch Scheduling

A first preparatory step in patch scheduling is a commercial agreement between the customer and the service provider about the maintenance window—the timespan during which updates may or must be performed. A maintenance window may be regular, or ad hoc, propelled by circumstances. The maintenance window must be known by the software running on the patch management server, i.e., the patch management application, or a separate scheduler application. It may be entered by the patch operator, or it may be communicated to the patch management server by the customer in any other manner, for example via a message via the object store.

A second preparatory step in patch scheduling is registration of the servers or racks of servers to be maintained. This step is handled by the bootstrap process described above (for example, in Step 430).

The third preparatory step is that a patch must actually be available. It is assumed here that the service provider has a steady stream of updates becoming available. When a patch is ready to be rolled out, the patch operator 190 registers the patch in the patch database 150, along with patch metadata, such as the patch name, its file location (which could be local or remote), the type of patch, dependencies, success metrics, a checksum, expected and maximum duration, and any other information relevant for the scheduling process.

Figure 6:
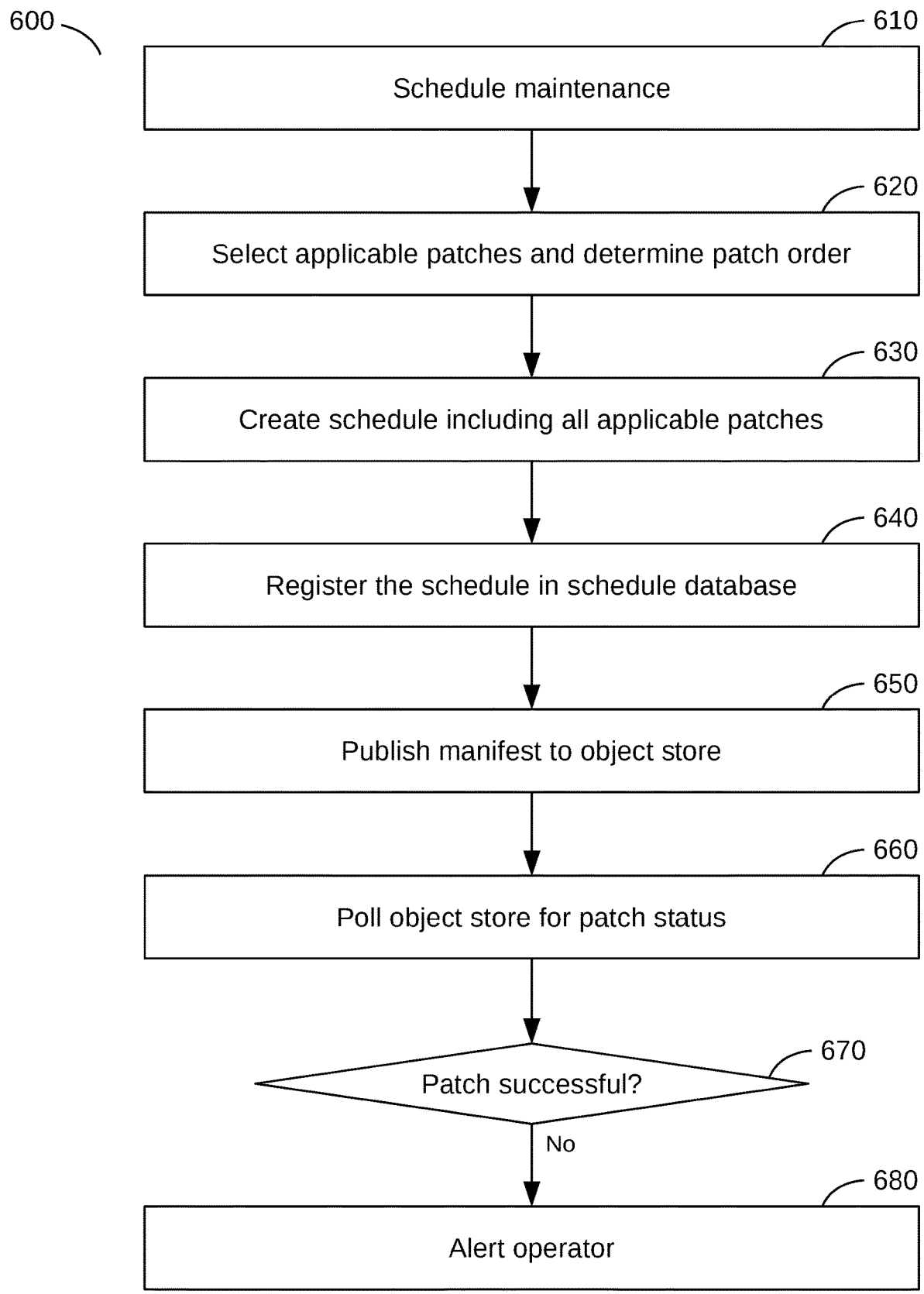
FIG. 6 illustrates the patch scheduling process at the patch management server according to an embodiment of the invention.

FIG. 6 illustrates the patch scheduling process 600 at the patch management server according to an embodiment of the invention. The process includes the following steps.

Step 610—Scheduling maintenance during the maintenance window. This step may be performed by humans, or an embodiment may automatically schedule maintenance tied to a recurring maintenance window.

Step 620—Selecting applicable patches based on registered servers in the managed system, and determining a patch order. The patch order is the order in which the patches must be executed or may be executed, taking dependencies into account.

Step 630—Creating a schedule during the maintenance window, including applicable patches ordered in the patch order.

Step 640—Registering the schedule in a schedule database.

Step 650—Uploading a manifest including the schedule to the object store. Along with the manifest, an embodiment may publish related binaries and other files to the object store.

Step 660—Polling the object store for the patch result and registering the result in the schedule database and/or the patch database.

Step 670—Determining from the patch result if the patch was successful.

Step 680—Upon determining that the patch was not successful, alerting a patch operator.

Figure 7:
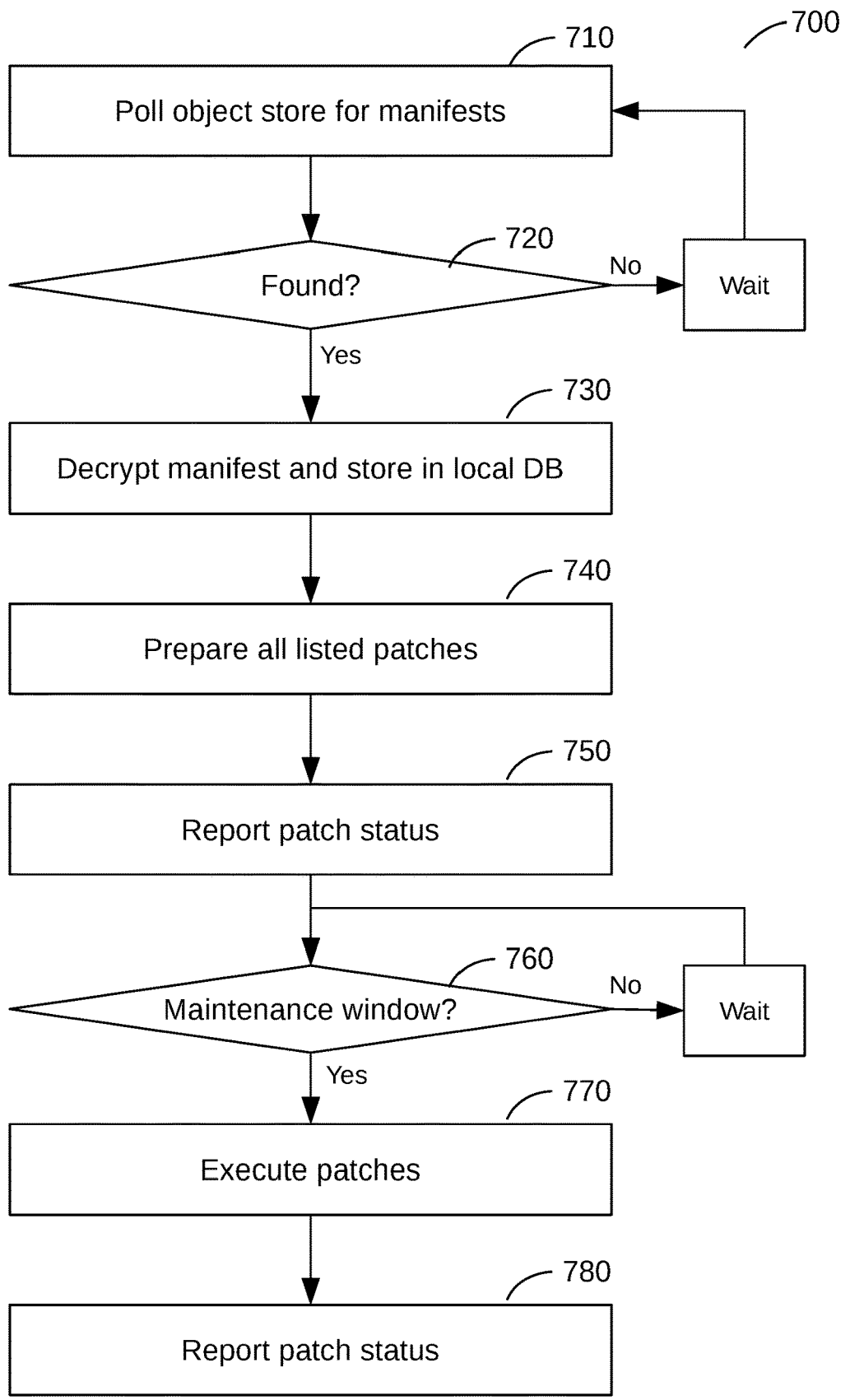
FIG. 7 illustrates the patch scheduling process at the patch agent according to an embodiment of the invention.

FIG. 7 illustrates the patch scheduling process 700 at the patch agent according to an embodiment of the invention. The process includes the following steps.

Step 710—Polling the object store for a manifest.

Step 720—If not found, wait and repeat Step 710 and Step 720.

Step 730—If a manifest was found, decrypting it and storing it in a local database. The local database may, for example, be an SQLite database.

Step 740—Preparing all patches specified in the manifest. Preparing may include downloading binaries (artifacts) prior to the maintenance window, decrypting the binaries, and storing them in the correct location.

Step 750—Reporting the status of the patches to the patch management server via the object store. In an embodiment, the status of a patch may be "STAGED".

Step 760—Determining if the maintenance window has started (and not ended). If not, wait and repeat Step 760.

Step 770—Upon determining that the maintenance window has started and not ended, execute the listed patches.

Step 780—Reporting the status of the patches to the patch management server via the object store. In an embodiment, the status of a patch may become "COMPLETED" or "FAILED".

In an embodiment, the patch management server allows for the definition of sets of patches that can be applied in three phases: before, during and after the maintenance window. Definition of the patch set includes specifying time offsets within the window, indicating, for instance, that a set of patches should execute at a time (e.g., 1 day) before the maintenance window. This provides a method for instructing the agent to automatically perform pre-patching activities that can be undertaken before the maintenance window begins (as well as post-patching activities that should be executed after the maintenance window completes). Embodiments can reuse the configuration of these combination of patches and time offsets since the timing defined therein can be relative to the maintenance window rather than to absolute time.

Embodiments may also provide a machine-readable audit trail of all patches applied to every server, rack of servers, or other grouping of servers, which can thus be used to produce an at-a-glance report that proves required patches have been applied successfully. This provides evidence for compliance to vulnerability patching policies. Such evidence may be useful with regards to legal requirements (such as the Sarbanes-Oxley Act) and to comply with quality control requirements. The audit record is also maintained at the customer site (and specific to the customer's managed system) and can be viewed by an operator, for example by running a report command locally when needed.

The Manifest

In an embodiment, a manifest includes a schedule of patches to be applied to one or more servers (for example, a rack of servers) in a managed system. Thus, a manifest may include a manifest identification, a customer identification, a rack (or other set of servers) identification, a start time of the maintenance window, an end time of the maintenance window, a location in the object store from which to download binaries (artifacts) related to patches, a location to which to download the binaries at the site of the patch agent, and the list of patches to run. Each patch to run may include the patch command and/or its arguments, and any other data needed to run the patch. Embodiments may include two types of artifacts: those that the patch agent must download from the object store, and those that are assumed to be already present at the patch agent site. Patches that must be downloaded are encrypted with a key that may be included in the manifest. Those that are already present at the patch agent site must be checked for being the expected version. Embodiments may include a checksum (such as an MD5 checksum) to verify that the version is correct.

FIG. 8 illustrates an example of an unencrypted (or decrypted) manifest 800 according to an embodiment of the invention. The main body of the manifest is the section "patch_schedules", which includes the following information: "customer_id", "id", "json_md5_checksum", "manifest_version", "artifacts", "patches", "rack_id", "response_URL", "window_end", and window_start". For the artifacts, it provides a location ("artifact"), as well as a decryption key and a download subdirectory at the patch agent site. For each patch (three are shown) there may be a name, a command, command arguments, a patch id, a checksum, a location (at the object store), a type designation (for example, "SHELL", or "ANSIBLE"), and other pertinent information.

Security

This patent document touches on security aspects of embodiments of the invention in many places. However, it is useful to also separately describe the main aspects here. In an embodiment, the cloud patch management service provider and the customer never establish a direct connection. All information passes through a message box system called the object store. Whereas the patch management server may access the object store through just a firewall, the patch agent, which is installed within the managed system or which is collocated with the managed system, communicates with the object store through at least a firewall, and a network that may be or include Internet. The patch agent communicates with the object store via separate write-only and read-only addresses (URLs), using the secure HTTPS protocol. The URLs, although publicly accessible, are customer-specific or rack-specific or even server-specific, and are not publicly disclosed. Additionally, all messages are encrypted, using encryption keys that again are customer-generated, and rack-specific or server-specific. Customers may renew encryption keys ad hoc or on a regular basis. When the customer renews an encryption key, the patch management server changes the URL(s). Embodiments may encrypt messages symmetrically or asymmetrically.

Patching itself happens only during an agreed maintenance window. The patching is executed by the patch agent rather than by a remotely located patch operator or by the patch management server. Because the patch agent executes all patching and controls at which times the managed system uses Internet for anything related to patching, the customer is physically in control of the process. Embodiments may provide an application programmers' interface (API) that the customer can use to control the maintenance window, and to view logs and inspect and/or control other data pertinent to the patch process.

Failure Remediation

Updates may fail for a wide variety of reasons. Some of the more common causes may be that the patch agent or the managed system runs out of memory (operating memory or storage memory); a dependency is missing, incorrect, or broken; an assumed existing directory doesn't exist; an authorization failure occurs; a linked library may not be in place or may have the wrong version; and a configuration file is missing or broken. Most operating systems issue error messages or warnings and error descriptions when any of these or other errors occur. Additionally, a patch may include commands to verify the results of any of its activities, and create a log of any such results.

When an update fails for any reason, the patch agent provides the patch management server a patch status update and logs that documents details of the patch results including error messages and warnings, and the patch management server alerts the patch operator. In embodiments, the patch agent halts the update process until the patch operator provides a remediation patch. In the remediation patch, the patch operator corrects any of the above (or any other) causes and then reruns the whole or the failed part of the failed patch again, to get to the desired result. Once the result of the previously failing patch is good, the embodiment resumes executing the remaining patches specified in the manifest.

Remediation may also be necessary for problems external to the managed system. For example, the object store may run out of space for a customer. An embodiment may detect this problem in two different ways. The patch agent may detect that a received file is corrupt and/or doesn't meet its checksum; or, the object store itself may send an alert to the patch management server that it is short of memory. The embodiment may resolve this problem in the same way by employing the patch operator to free up or otherwise create space. In this case, the problem may even be resolved prior to the maintenance window.

To support failure remediation, in some embodiments, patches have the following properties. (1) idempotency—a patch run twice leaves the managed system in the same state as when it is run only once; (2) reentrancy—if a patch fails partway, rerunning the patch resumes where it failed, or skips steps that have already been performed successfully.

Figure 9:
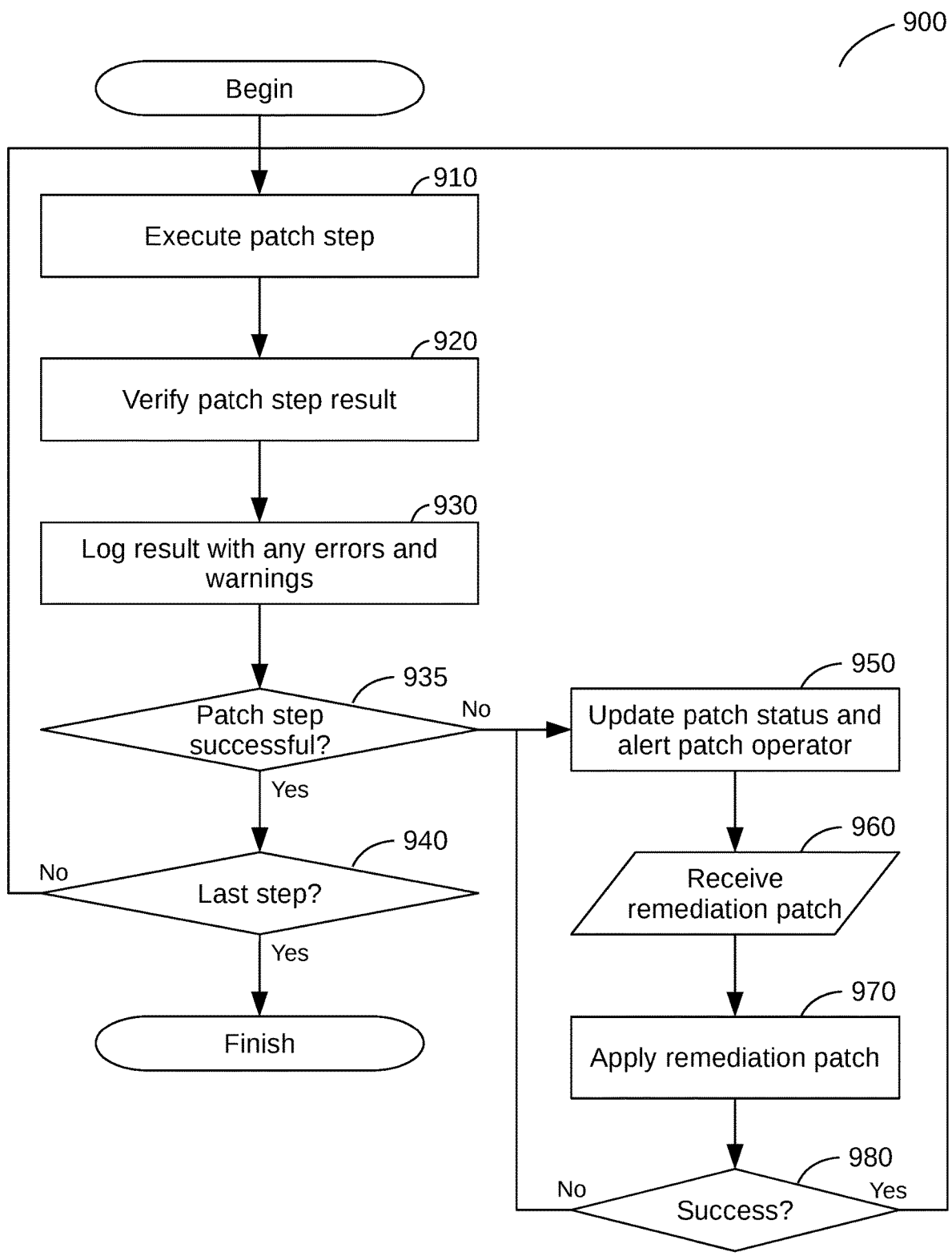
FIG. 9 illustrates an example method to support patch failure remediation at the patch agent, according to an embodiment of the invention.

FIG. 9 illustrates an example method 900 to support patch failure remediation at the patch agent, according to an embodiment of the invention. The method comprises the following steps.

Step 910—Executing a first patch step that has not been successfully executed yet. The method begins with the first patch step in the manifest, then proceeds with the second step of the patch, and so on.

Step 920—Verifying the result of the executed patch step, obtaining a verification result. In some embodiments, the verification may be performed using one or more commands specified in the patch itself.

Step 930—Logging the verification result, along with any operating system warnings and error messages received. The operating system may be the operating system running on one or more servers being updated.

Step 935—Determining if the patch step has been successful. The patch agent determines from the verification result and any operating system warnings and error messages received if the patch step has been successful. Upon determining that the patch step has been successful, the method proceeds with Step 940, otherwise it proceeds with Step 950.

Step 940—Determining if the patch step that has been successfully executed is the final patch step. If not, then continuing with Step 910. Otherwise, updating the patch status as "COMPLETED", and the patch execution has been completed.

Step 950—Updating the patch status as "FAILED" and alerting the patch operator via the object store and the patch management server. Along with the alert, an embodiment provides the log that includes all patch steps along with their verification results and received operating system warnings and error messages.

Step 960—Receiving a remediation patch. The patch agent polls the object store for a remediation patch until it finds one, and then proceeds with Step 970.

Step 970—Applying the remediation patch. Since execution of the remediation patch itself may or may not be successful, an embodiment may apply method 900 recursively to run the remediation patch.

Step 980—Determining if the remediation patch has been successful; repeating Step 950, Step 960, Step 970 and Step 980 if not; otherwise, proceeding with Step 910.

Figure 10:
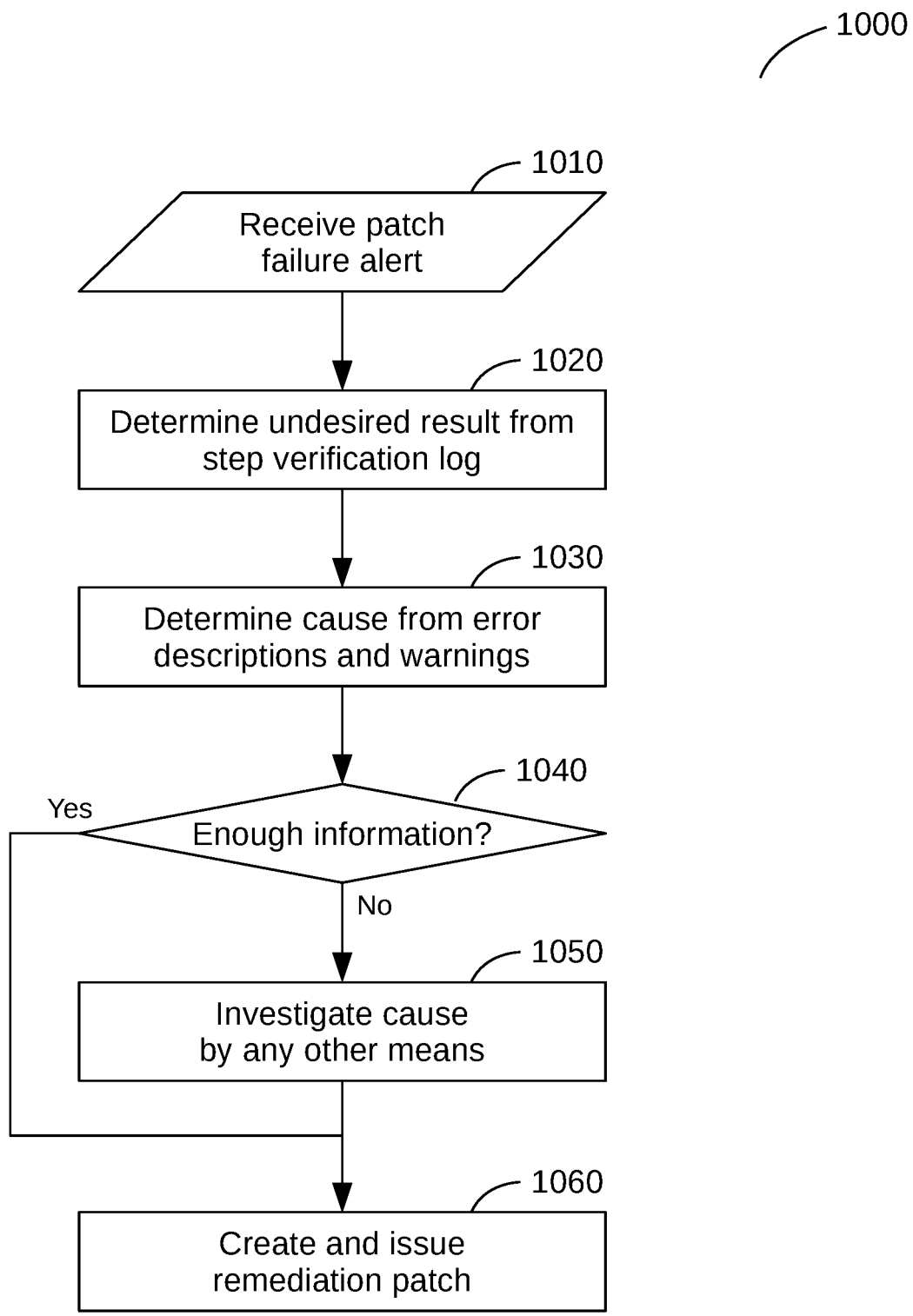
FIG. 10 illustrates an example method to support patch failure remediation at the patch management server according to an embodiment of the invention.

FIG. 10 illustrates an example method 1000 to support patch failure remediation at the patch management server according to an embodiment of the invention. The method comprises the following steps.

Step 1010—Receiving a patch failure alert. The patch management agent receives the patch failure alert from the patch agent via the object store. The patch failure alert includes a log with verification results and received operating system warnings and error messages for all patch steps that the patch agent has so far executed.

Step 1020—Determining an undesired result from the verification results for all patch steps that the patch agent has so far executed. The patch operator reviews the log and the included verification results to determine the undesired result.

Step 1030—Determining a cause of the undesired result from the operating system warnings and error messages for all patch steps that the patch agent has so far executed. The patch operator reviews the operating system warnings and error messages to determine the cause or causes of the undesired result.

Step 1040—Determining if the patch failure alert included sufficient information to determine the cause of the undesired result. If no, then proceeding with Step 1050, else proceeding with Step 1060.

Step 1050—Investigating the cause of the undesired result by any other means. The methods available to the patch operator depend on the authorization level granted by a customer. They may include collaboration with an operator at the managed system site. In some cases, they may include a possibility for the patch operator to directly log in to the managed system and/or the patch agent.

Step 1060—Creating and issuing a remediation patch based on and correcting the cause of the undesired result. Some embodiments may rerun the failed patch execution step or any other steps of the failed patch. The patch agent creates the remediation patch, and issues it to the patch agent via the patch management server and the object store.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general-purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for updating software in one or more servers in a managed system remotely, the method comprising:

bootstrapping secure communication by sending a first message from the managed system to an object store for retrieval by a patch management server, the first message comprising an identifier of the one or more servers and an encryption key;

generating a plurality of uniform resource locators that are individually unique, each uniform resource locator ("URL") dedicated to a type of communication to access a distinct location of a plurality of locations in the object store, each location designated for the respective type of communication-regarding the one or more servers;

adding an encrypted section to a registration object, the encrypted section including the one or more of the plurality of locations, and making the registration object available in the object store;

sending a second message from the patch management server to the object store, the second message comprising a manifest with a schedule for a software update in the one or more servers identified in the first message and a specification of the software update;

retrieving via a first URL of the plurality of URLs associated with a manifest location of the plurality of locations for accessing the manifest, the second message from the object store by a patch agent of the managed system;

applying the software update by the patch agent during a maintenance window specified in the schedule;

sending a third message from the patch agent to the object store via a second URL of the plurality of URLs associated with a result location of the plurality of locations, the third message comprising a result of the software update;

retrieving the third message from the object store by the patch management server to determine if the software update is successful;

upon determining that the software update is unsuccessful, sending a communication to a patch operator including an alert of the result and information about the software update; and applying at least one resolution received from the patch operator, to successfully complete the software update.

2. The method of claim 1, wherein:
the object store includes a web server and is accessible using a hypertext transfer protocol secure (HTTPS) protocol;
the patch agent communicates asynchronously with the patch management server via the plurality of locations in the object store using the HTTPS protocol via the plurality of URLs; and
all messages and binaries sent after the first message are encrypted with respect to the encryption key.

3. The method of claim 1, wherein:
the object store includes a file transfer protocol server and is accessible using a file transfer protocol secure (FTPS) protocol;
the patch agent communicates asynchronously with the patch management server via the plurality of locations in the object store using the FTPS protocol via the plurality of URLs; and
all messages and binaries sent after the first message are encrypted with respect to the encryption key.

4. The method of claim 1, further comprising:
generating a globally unique identifier (GUID) and the encryption key associated with and specific to the one or more servers for inclusion in the first message;
polling the registration object until the registration object includes a key-value pair including a key and a value, in which the key equals the GUID;
upon determining that the registration object includes a key-value pair in which the key equals the GUID, decrypting one of the value and information in a location referred to by the value using the encryption key to obtain an individual read-only URL for communication specific to the one or more servers; and
saving the individual read-only URL to use for communication specific to the one or more servers.

5. The method of claim 1, further comprising:
polling a key bucket until the key bucket holds the first message including a GUID;
upon determining that the key bucket holds the first message with the GUID, the encryption key, and the identifier of the one or more servers, registering the one or more servers, and associating the GUID and the encryption key with the one or more servers;
assigning each of the plurality of locations to the type of communication specific to the one or more servers, wherein the plurality of URLs include one or more read-only URLs;
encrypting the one or more read-only URLs using the encryption key from the first message; and
updating the registration object by adding a key-value pair including a key and a value, wherein the key equals the GUID and the value includes or refers to the one or more encrypted read-only URLs.

6. The method of claim 1, wherein a key bucket URL and a registration object URL are specific to the managed system.

7. The method of claim 1, wherein a read-only URL and a write-only URL give the patch agent access to locations in the object store that are specific to one of a server, a rack of servers, and another collection of servers.

8. The method of claim 1 further comprising:
creating a software update to run a key rotation script;
publishing the manifest for the software update to the patch agent via the object store;
marking a patch database as "in rotation" for a duration of the key rotation script;
executing the software update to run the key rotation script to trigger a bootstrap process;
executing the bootstrap process;
re-encrypting and republishing any pending manifests; and
marking the patch database as no longer "in rotation".

9. The method of claim 1, further comprising:
scheduling maintenance during the maintenance window;
selecting the software update based on the one or more servers in the managed system;
determining a patch order;
creating the schedule during the maintenance window, including the software update ordered in the patch order;
registering the schedule in a schedule database;
uploading the manifest including the schedule to the object store;
polling the object store for the result; and
registering the result in the schedule database and/or a patch database.

10. The method of claim 1, further comprising:
polling the object store until the manifest is found;
storing the manifest in a local database;
preparing the software update specified in the manifest, wherein preparing may include one or more of: (i) downloading binaries; (ii) decrypting the binaries; and (iii) storing the binaries in a correct location;
reporting a status of the software update to the patch management server;
waiting until the maintenance window has started and not ended;
upon determining that the maintenance window has started and not ended, execute the software update; and
reporting a status of the software update to the patch management server via the third message sent to the object store.

11. The method of claim 1, further comprising:
executing a current patch step that has not been successfully executed before;
verifying a result of the executed current patch step to obtain a verification result;

logging the verification result, along with any operating system warnings and error messages received;

determining from the verification result and received operating system warnings and error messages if the current patch step is successful;

upon determining that the current patch step is successful, determining if the current patch step that is successfully executed is a final patch step, wherein if the current patch step is not final, reiterating the executing of the patch step, verifying the result, logging the verification result, and determining if the current patch step is successful, to achieve a final patch step; and upon determining that the current patch step is unsuccessful:

updating a patch status the object store and the patch management server, wherein the updating includes providing to a patch operator a log that includes the executed patch steps along with associated verification results and received operating system warnings and error messages;

polling the object store until the patch agent receives a remediation patch; and applying the remediation patch.

12. The method of claim 1, further comprising:

receiving a patch failure alert including a log with verification results and received operating system warnings and error messages for patch steps that the patch agent has so far executed;

determining an undesired result from the verification results for all patch steps that the patch agent has so far executed;

determining a cause of the undesired result from the operating system warnings and error messages for patch steps that the patch agent has so far executed; and issuing a remediation patch based on and correcting the cause of the undesired result.

13. The method of claim 1, further comprising using the result to create a machine-readable audit trail that can be used to provide compliance evidence.

14. The method of claim 1, further comprising implementing a regional deployment model where data is confined to regions.

15. The method of claim 1, further comprising:

sending at least one heartbeat message from the patch agent to the object store via a third URL of the plurality of URLs associated with a heartbeat location of the plurality of locations, the at least one heartbeat message comprising notification that the managed system is currently operational to communicate with the object store.

16. A patch agent apparatus for locally patching a managed system including one or more servers with information from a remotely located patch management server, the patch agent comprising one or more processors and logic encoded in one or more non-transitory media for execution by the one or more processors and when executed operable to perform the following steps:

bootstrapping secure communication by sending a first message from the managed system to an object store, the first message comprising an identification of the one or more servers and comprising an encryption key;

retrieving a second message comprising a manifest with a schedule, from the object store via a first URL of a plurality of URLs dedicated to a type of communication to access a distinct location of a plurality of locations in the object store, the first URL being associated with a manifest location of the plurality of locations for accessing the manifest;

storing the schedule in a database;

applying a software update during a maintenance window specified in the schedule;

sending a third message via a second URL of the plurality of URLs, associated with a result location of the plurality of locations to the object store, the third message comprising a result of the software update, wherein the second URL is different from the first URL; and for an unsuccessful software update, receiving a resolution from a patch operator and applying the resolution to successfully complete the software update.

17. One or more non-transitory media including instructions executable by one or more processors for patching a managed system including one or more servers, the instructions when executed performing the following acts to bootstrap secure communication:

polling a key bucket until the key bucket holds a first message including a GUID;

upon determining that the key bucket holds the first message with a GUID, an encryption key, and an identifier of the one or more servers, registering the one or more servers, including associating the GUID and the encryption key with the one or more servers;

generating a plurality of uniform resource locators that are individually unique, each uniform resource locator ("URL") dedicated to a type of communication to access a distinct location of a plurality of locations in an object store, each location designated for the respective type of communication-regarding the one or more servers;

encrypting the plurality of URLs using the encryption key;

updating a registration object by adding a key-value pair including a key and a value, wherein the key equals the GUID and the value includes or refers to the encrypted one or more URLs;

scheduling maintenance during a maintenance window;

selecting applicable patches based on registered servers in the managed system, and determining a patch order;

creating a schedule during the maintenance window, including the applicable patches ordered in the patch order;

registering the schedule in a schedule database;

uploading a manifest including the schedule to a manifest location of the plurality of locations of the object store, wherein the manifest is accessible via a first URL of the plurality of URLs, associated with the manifest location;

polling the object store for a patch result uploaded to a result location of the plurality of locations via a second URL of the plurality of URLs, associated with the result location;

registering the patch result in the schedule database and/or a patch database;

determining from the patch result if the patch is successful; and upon determining that the patch is not successful, alerting a patch operator.

* * * * *

UNITED STATES PATENT AND TRADEMARK OFFICE
CERTIFICATE OF CORRECTION

PATENT NO. : 11,520,572 B2  
APPLICATION NO. : 16/691469  
DATED : December 6, 2022  
INVENTOR(S) : Christopher Fagiani Page 1 of 1

It is certified that error appears in the above-identified patent and that said Letters Patent is hereby corrected as shown below:

In the Specification

In Column 9, Line 10, delete "8" and insert -- B --, therefor.

In the Claims

In Column 19, Line 17, in Claim 11, delete "operator" and insert -- operator, --, therefor.

Signed and Sealed this
Fifteenth Day of August, 2023

Katherine Kelly Vidal
*Director of the United States Patent and Trademark Office*